United States Patent
Benni et al.

(10) Patent No.: US 10,067,573 B2
(45) Date of Patent: Sep. 4, 2018

(54) DEVICE FOR CONTROL/COMMAND OF A PLURALITY OF MAN-MACHINE DIALOGUE FACILITIES

(71) Applicant: Schneider Electric Industries SAS, Rueil Malmaison (FR)

(72) Inventors: Dominique Benni, Mornac (FR); Francis Chauvet, Mouthiers (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 16 days.

(21) Appl. No.: 15/501,870

(22) PCT Filed: Sep. 2, 2015

(86) PCT No.: PCT/EP2015/070042
§ 371 (c)(1),
(2) Date: Feb. 6, 2017

(87) PCT Pub. No.: WO2016/050440
PCT Pub. Date: Apr. 7, 2016

(65) Prior Publication Data
US 2017/0228039 A1    Aug. 10, 2017

(30) Foreign Application Priority Data
Sep. 30, 2014   (FR) ...................... 14 59244

(51) Int. Cl.
*G06F 3/02* (2006.01)
*H04Q 9/00* (2006.01)
(Continued)

(52) U.S. Cl.
CPC ............. *G06F 3/0219* (2013.01); *G08B 5/36* (2013.01); *G10L 15/22* (2013.01); *G10L 15/32* (2013.01);
(Continued)

(58) Field of Classification Search
CPC ......... G06F 3/0219; G08B 5/36; G10L 15/22; G10L 15/32; H04Q 2201/802; H04Q 9/00
See application file for complete search history.

(56) References Cited

U.S. PATENT DOCUMENTS

| 6,215,204 B1 | 4/2001 | Brown et al. |
| 6,686,672 B2 * | 2/2004 | Brown ................. H05K 7/1471 307/125 |

(Continued)

FOREIGN PATENT DOCUMENTS

| EP | 1703530 A1 | 9/2006 |
| EP | 2781993 A2 | 9/2014 |

OTHER PUBLICATIONS

International Search Report dated Apr. 7, 2016 in PCT/EP2015/070042 filed Sep. 2, 2015.

*Primary Examiner* — Quan-Zhen Wang
*Assistant Examiner* — Rajsheed Black-Childress
(74) *Attorney, Agent, or Firm* — Oblon, McClelland, Maier & Neustadt, L.L.P.

(57) ABSTRACT

The invention relates to a device for control/command of a plurality of man-machine dialog facilities which are linked in series in such a way as to form a network. This device comprises a wire interconnection block linked by a point-to-point link to each dialog facility via a network of twisted cables.

8 Claims, 7 Drawing Sheets

(51) Int. Cl.
*G08B 5/36* (2006.01)
*G10L 15/32* (2013.01)
*G10L 15/22* (2006.01)

(52) U.S. Cl.
CPC ......... H04Q 9/00 (2013.01); *H04Q 2201/802* (2013.01)

(56) References Cited

U.S. PATENT DOCUMENTS

| | | | |
|---|---|---|---|
| 7,116,538 B2 * | 10/2006 | Haensgen | H01H 71/0228 361/93.1 |
| 7,528,710 B2 | 5/2009 | Halfmann et al. | |
| 8,070,609 B2 * | 12/2011 | Waxman | G06F 3/0202 463/46 |
| 2003/0058623 A1 | 3/2003 | Veil et al. | |
| 2006/0209488 A1 | 9/2006 | Papenbreer | |
| 2014/0289438 A1 | 9/2014 | Benni et al. | |

* cited by examiner

DEVICE FOR CONTROL/COMMAND OF A PLURALITY OF MAN-MACHINE DIALOGUE FACILITIES

TECHNICAL FIELD

The invention relates to a device for monitoring/controlling a plurality of human-machine dialog members connected in series so as to form a network.

The invention more particularly, but not exclusively, applies to human-machine dialog members such as, for example, indicator lights, rotary buttons or pushbuttons, the status of which must be controlled and/or monitored in order to ensure the safety of an industrial installation.

PRIOR ART

The human-machine dialog members of devices of the prior art are composed of unitary modules connected in series and connected to a master module by a data bus. The patent application EP 2 479 646 A1 describes a device comprising a first portion equipped with a data processing unit and an electrical power supply unit, a second portion comprising multiple human-machine dialog members each endowed with a human-machine dialog interface and a communication bus connecting the power supply unit and the processing unit to each human-machine dialog member.

One drawback of this system arises from the fact that all of the dialog members must be configured by means of a computer or a specific terminal. In this case, a specific address must be assigned to each dialog member so that the master monitoring/control module may deliver specific messages thereto. This operation is restrictive for the installer of this device.

Another drawback of such a device arises from the fact that under certain industrial conditions with high levels of electromagnetic interference, the data exchanged, via the communication bus, between the human-machine dialog members and the processing unit may be subject to degradation, creating a risk of malfunction of the monitored devices and endangering the safety of the users of these devices.

Another drawback of these devices arises from the fact that the processing unit must necessarily possess intelligence and a communication protocol in order to manage the delivery and exchange of data.

One objective of the invention is to overcome the drawbacks of the prior art described above by virtue of a robust and simplified device.

More specifically, the objective of the invention is a device allowing multiple human-machine dialog members to be physically connected to a master monitoring control module without restrictions on the positioning of the control members with respect to the master monitoring module.

Another objective is to reliably monitor the respective statuses of these dialog members regardless of the industrial environment in which they are used.

SUMMARY OF THE INVENTION

The objective of the invention is achieved by means of a device for monitoring/controlling a plurality of human-machine dialog members connected in series so as to form a network.

According to the invention, this device comprises a wired interconnection block connected by point-to-point link to each dialog member via a network of twisted cables.

In a first embodiment of the device according to the invention, said wired interconnection block additionally comprises a microcontroller.

In this embodiment, said interconnection block comprises one or more common contact terminals connected to each dialog member and at least two series of contact terminals BGi, BDi, i=1 to N, N being a whole number, which are intended to connect the interconnection block to each dialog member regardless of the position of the latter with respect to the interconnection block.

In one embodiment of the invention, each dialog member comprises at least one indicator light or at least one electrical contact.

BRIEF DESCRIPTION OF THE DRAWINGS

Other features and advantages of the invention will emerge from the following description, taken by way of non-limiting example, with reference to the appended figures in which.

DETAILED DESCRIPTION OF PARTICULAR EMBODIMENTS

Throughout the rest of the description, identical references will be used to denote the elements common to the various modules of the device according to the invention.

Figure 1:
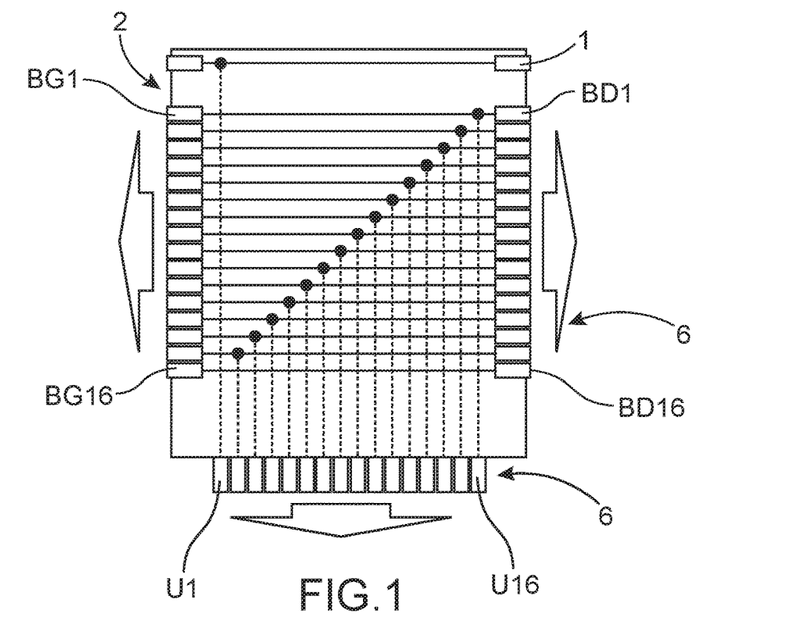
FIG. 1 schematically illustrates a first variant of an interconnection block according to the invention.

FIG. 1 illustrates an interconnection block comprising a common electrical contact terminal 1, a first series of electrical contact terminals, referred to as left terminals BG1 to BG16, a second series of electrical contact terminals, referred to as right terminals BD1 to BD16, the left electrical contact terminals BG1 to BG16 are connected by wiring to the right electrical contact terminals BD1 to BD16 and to a third series of electrical output terminals U1 to U16 outputting to an external monitoring/control module.

Figure 3A:
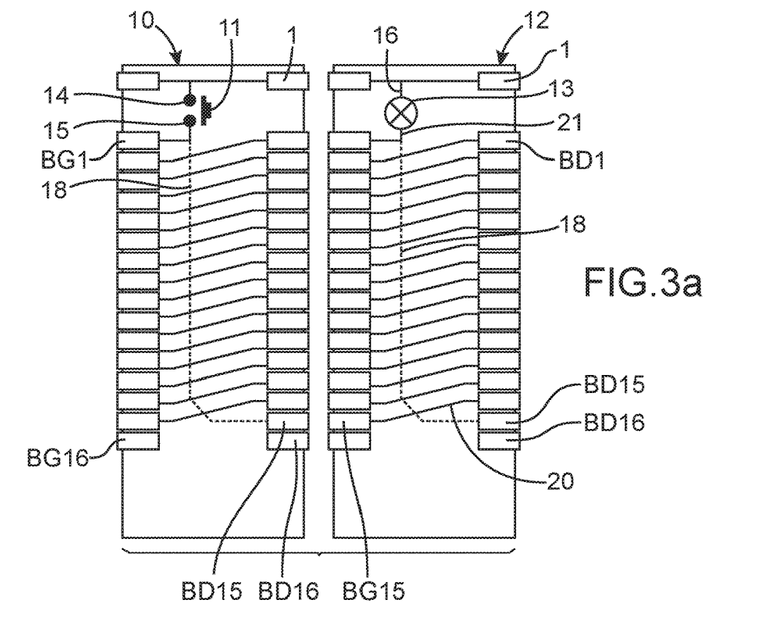
FIGS. 3a to 3c schematically illustrate exemplary interconnections of dialog members in the device according to the invention.
Figure 3B:
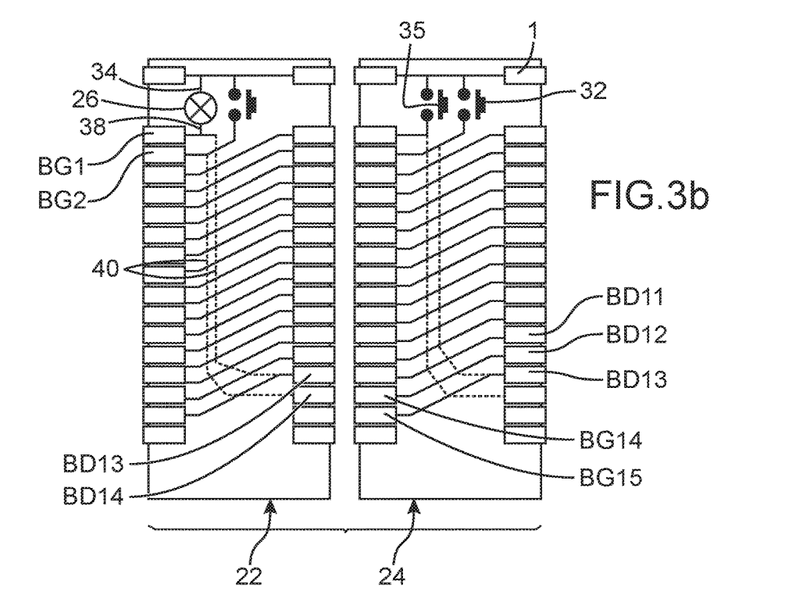

In addition to an interconnection block, the monitoring/control device comprises a plurality of dialog members connected in series and to the interconnection block. In FIGS. 3a and 3b, each dialog member comprises, for example, a first series of electrical contact terminals, referred to as left terminals BG1 to BG16, and a second series of electrical contact terminals, referred to as right terminals BD1 to BD16. Each dialog member comprises at least one functional element, for example an electrical contact or an indicator light, or a combination of an electrical contact and an indicator light.

FIG. 3a thus shows two dialog members 10 and 12 connected in series. The first dialog member 10 comprises an electrical contact 11 and the second dialog member 12 comprises an indicator light 13. A first terminal 14 of the electrical contact and a first terminal 16 of the indicator light are intended to be connected to the common electrical contact terminal 1. A second terminal 15 of the electrical contact is connected, on the one hand, to the terminal BG1 of the dialog member 10 and, on the other hand, to the terminal BD15 of this dialog member 10 by means of a connecting wire 18 (shown in dotted lines). This terminal BD15 of the dialog member 10 is connected to the terminal BG15 of the dialog member 12 which is itself connected by wiring to the terminal BD14 of this dialog member 12. The latter may be connected to the interconnection block 2 directly or via the successive contact terminals of one or more adjacent dialog members connected in series. Likewise, a second terminal 21 of the indicator light 13 is connected, on the one hand, to the terminal BG1 of the dialog member 12 and, on the other hand, to the terminal BD15 of the dialog member 12 by means of a connecting wire 18 (shown in dotted lines). The latter may be connected to the interconnection block 2 directly or via the successive contact terminals of one or more adjacent dialog members connected in series.

FIG. 3b shows two dialog members 22 and 24 connected in series. The first dialog member 22 comprises an indicator light 26 and an electrical contact 28. The second dialog member 24 comprises a first electrical contact 35 and a second electrical contact 32. A first terminal 34 of the indicator light 26 and a first terminal 36 of the electrical contact 28 are connected to the common electrical contact terminal 1. A second terminal 38 of the indicator light 26 is connected, on the one hand, to the terminal BG1 and, on the other hand, to the terminal BD13 of the dialog member 22 by means of a connecting wire 40 (shown in dotted lines), the terminal BD13 of the dialog member 22 is connected to the terminal BG13 of the second dialog member 24. The latter is connected by wiring to the terminal BD11 of this dialog member 24, which may be connected to the interconnection block 2 directly or via the contact terminals of one or more adjacent dialog members connected in series.

Likewise, a second terminal 41 of the electrical contact 28 is connected, on the one hand, to the terminal BG2 of the dialog member 22 and, on the other hand, to the terminal BD14 of the dialog member 22 by means of a connecting wire 40 (shown in dotted lines), the terminal BD14 of the dialog member 22 may be connected to the terminal BG14 of the second dialog member 24. The latter terminal BG14 is connected to the terminal BD12 of the dialog member 24. The latter may in turn be connected to the interconnection block 2 directly or via the contact terminals of one or more adjacent dialog members connected in series.

Figure 3C:
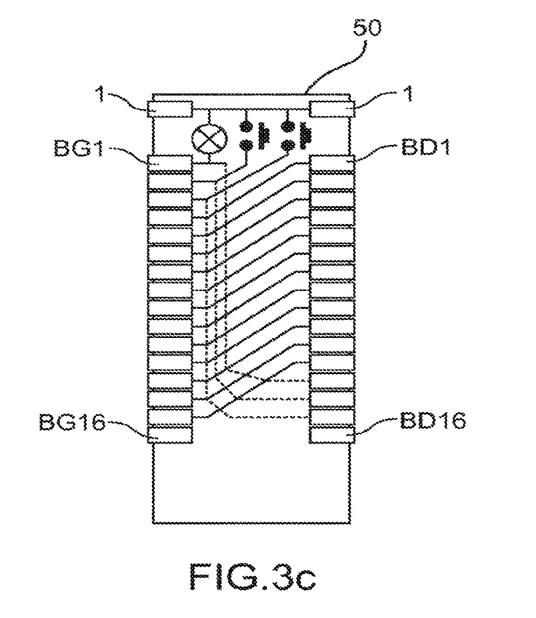

FIG. 3c shows an exemplary dialog member 50 comprising an indicator light, and two electrical contacts each having a first terminal connected to the common contact terminal 1 and second terminals connected to the terminals BD13, BD14 and BD15, respectively. The latter may be connected to the interconnection block 2 directly or via the contact terminals of one or more adjacent dialog members connected in series.

Figure 2:
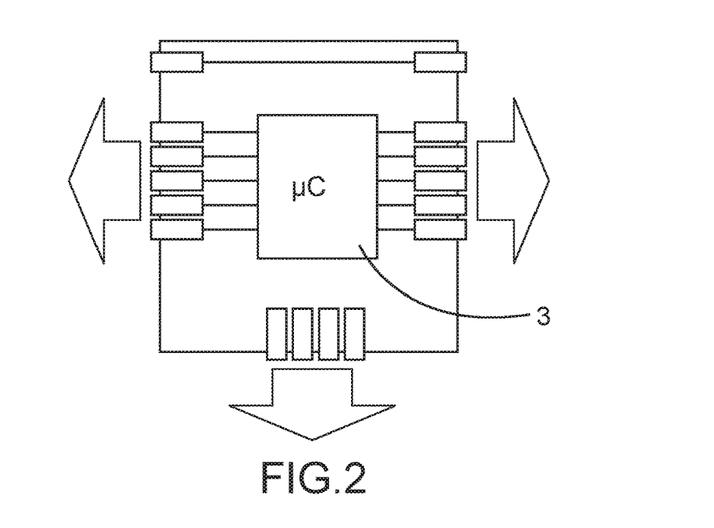
FIG. 2 schematically illustrates a second variant of an interconnection block according to the invention.

FIG. 2 schematically illustrates a variant embodiment in which the interconnection block 2 comprises a common electrical contact terminal 1, a first series of left electrical contact terminals BG1 to BG4, a second series of right electrical contact terminals BD1 to BD4 and a microcontroller 3, to one side of which the left electrical contact terminals are connected and to the other side of which the right electrical contact terminals are connected. The use of a microcontroller in the interconnection block will allow, in particular, a protocol for reading and writing the status of each dialog member to which it is connected to be implemented between the block and each dialog member.

In general, the invention is applicable to the case in which the device according to the invention may be used to monitor and control one or more human-machine dialog members, each equipped with n terminals. The terminal BG1 of each human-machine dialog member will be connected to the common terminal 1 of an interconnection block via the electrical contact or the indicator light. Thus, if the dialog member comprises only one functional element, each terminal BGi is connected to the terminal BDi−1 of this dialog member. If the dialog member comprises a second functional element, this is placed between the terminal BG2 and the common terminal 1 of the interconnection block. If the member comprises three functional elements, each terminal BGi is connected to the terminal BDi−3. Thus, in the case of a single functional element, the terminal BDn−1 is connected to the functional element (electrical contact or indicator), in the case of two functional elements, it is the terminal BDn−2 that will be connected to the functional element and in the case of three functional elements, it is the terminal BDn−3 that will be connected to the functional element (the case of a three-position rotary button employing two electrical contacts).

It is apparent from the above description that all of the dialog members are physically connected to one another and to the interconnection block 2, either directly or through other, adjacent dialog members, such that the status and monitoring signals of each of these members may be exchanged directly with a monitoring/control module connected to the interconnection block or to the microcontroller 3 of this block, if it has one. By virtue of the wiring described above, multiple dialog members may be connected in series with the interconnection block and exchange data with this block regardless of their positions with respect to this block 2.

Figure 4:
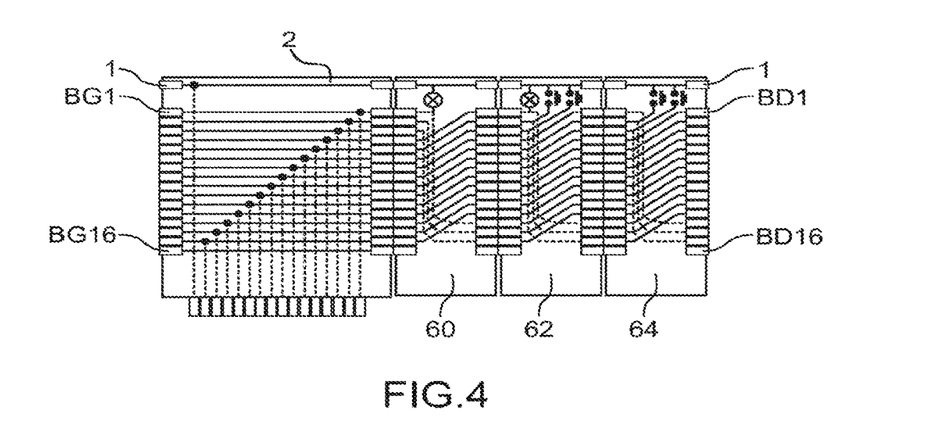
FIG. 4 schematically illustrates a first exemplary interconnection of dialog members to the interconnection block of FIG. 1.

FIG. 4 illustrates an example of wiring in which the interconnection block 2 is connected at the left end of an assembly of dialog members 60, 62 and 64.

Figure 5:
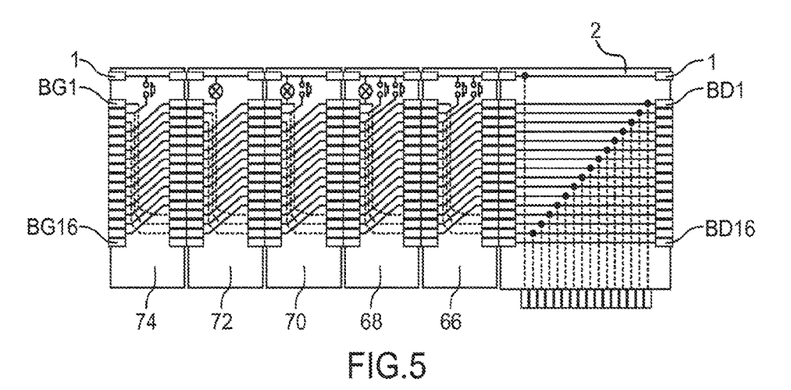
FIG. 5 schematically illustrates a second exemplary interconnection of dialog members to the interconnection block of FIG. 1.

FIG. 5 illustrates an example of wiring in which the interconnection block 2 is connected at the right end of an assembly of dialog members 66, 68, 70, 72 and 74.

Figure 6:
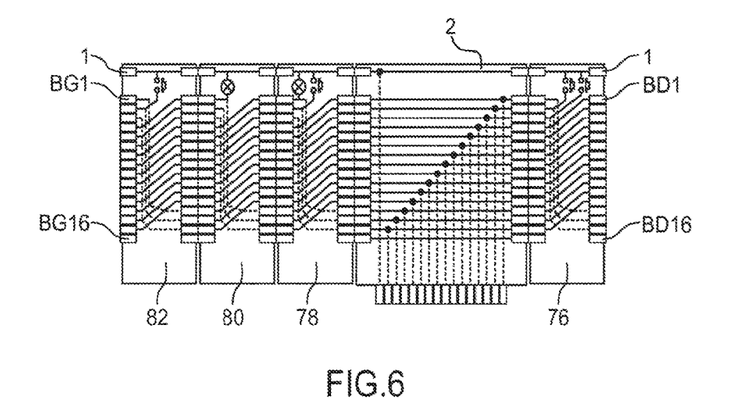
FIG. 6 schematically illustrates a third exemplary interconnection of dialog members to the interconnection block of FIG. 1.

FIG. 6 illustrates an example of wiring in which the interconnection block 2 is intercalated between two dialog members 76 and 78 of an assembly of dialog members 76, 78, 80 and 82. The interconnection block 2 of FIGS. 4 to 6 may be connected to an external monitoring/control module via the terminals U1 to U16.

It should be noted that the interconnection block 2 may be equipped with communication means in order to exchange data with said external monitoring/control module via a wireless link.

Figure 7:
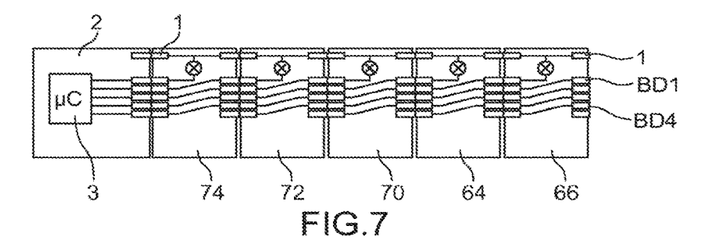
FIG. 7 schematically illustrates a fourth exemplary interconnection of dialog members to the interconnection block of FIG. 1.
Figure 8:
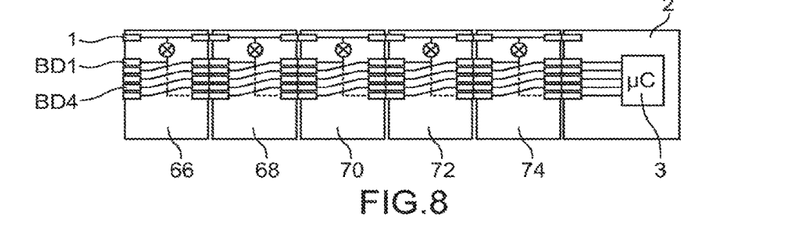
FIG. 8 schematically illustrates a first exemplary interconnection of dialog members to the interconnection block of FIG. 2.
Figure 9:
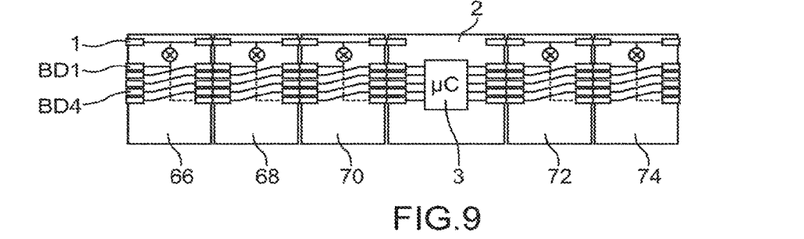
FIG. 9 schematically illustrates a second exemplary interconnection of dialog members to the interconnection block of FIG. 2.

FIGS. 7 to 9 illustrate examples of wiring the dialog members to an interconnection block 2 equipped with a microcontroller configured to control the status of each dialog member. As may be seen in the figures, the interconnection block 2 may be arranged at one of the ends of the device or between two dialog members of this device.

Figure 10:
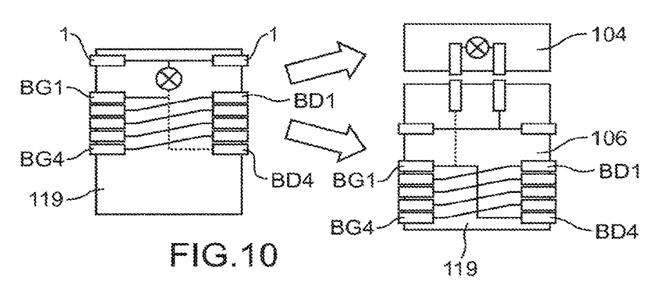
FIGS. 10 to 14 schematically illustrate exemplary interconnections between dialog members and an interconnection block according to the invention.
Figure 11:
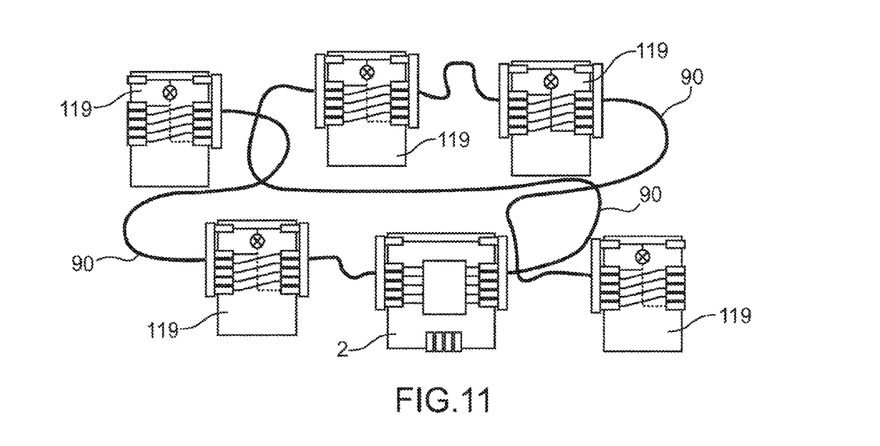

In another variant embodiment of the invention schematically illustrated in FIG. 10, the functional elements 104 of the dialog members 119 (indicator lights and electrical contacts for example) are separated from the connection portion 106 and each dialog member is physically connected to another dialog member, which is not necessarily adjacent thereto, by a multiconductor cable 90. The interconnection block may be intercalated between two dialog members to which it is also connected by a multiconductor cable 90. It should be noted that two or more adjacent dialog members may be joined directly by their respective terminals BGi and BDi in order to form a unitary block 120. The interconnection block 2 may be intercalated between two blocks of dialog members 120 to which it may be connected either directly by their respective terminals BGi and BDi or by a multiconductor cable 90 as illustrated by FIGS. 12 and 13.

The variant described above in conjunction with FIG. 10 allows identical dialog members to be connected which are subsequently customized through the addition of a functional element of electrical contact or indicator type. Likewise, depending on the installation constraints, the functional element may be displaced with respect to the module using a cable.

Figure 12:
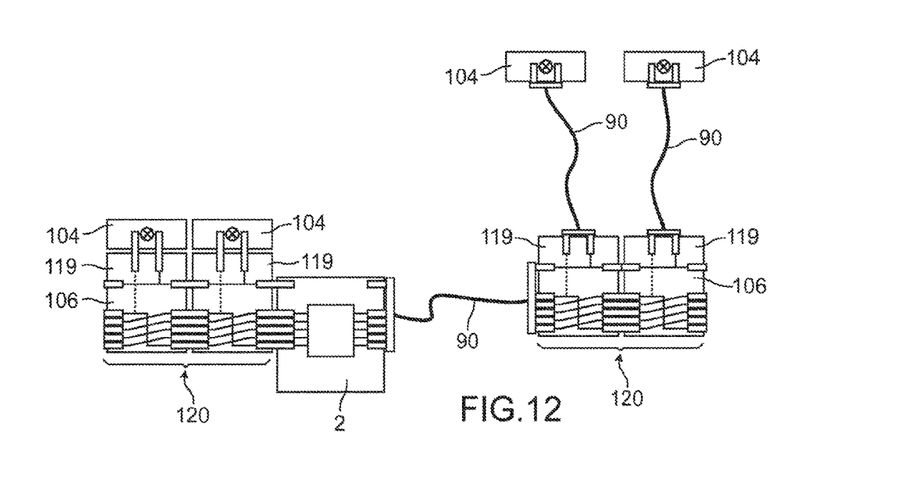
Figure 13:
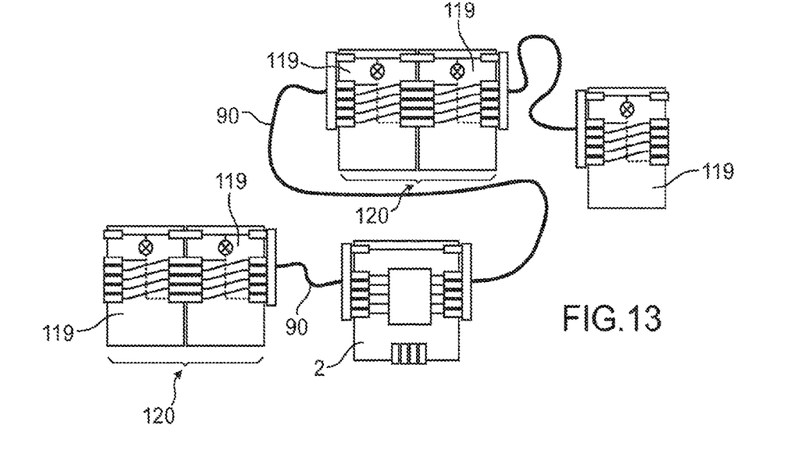
Figure 14:
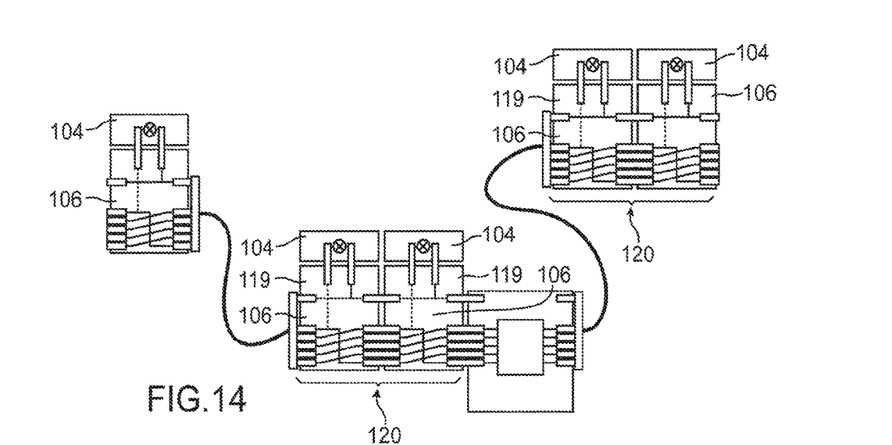

In order to account for the environment and the installation constraints of the device according to the invention, a microcontroller may be inserted at any position between two dialog members or two blocks of adjacent dialog members as illustrated by FIGS. 12 to 14. It may be connected to the dialog members either directly or by means of a multiconductor cable 90.

The invention claimed is:

1. A device for monitoring/controlling a plurality of human-machine dialog members connected in series so as to form a network, comprising:

a wired interconnection block connected by a point-to-point link to each dialog member via a network of twisted cables, wherein each dialog member is one of an indicator light and a button, in which said interconnection block comprises at least one common contact terminal connected to each dialog member, and at least two series of contact terminals (BGi; BDi, i=1 to n, n being a whole number), which are configured to connect the interconnection block to each dialog member regardless of the position of each dialog member with respect to the interconnection block.

2. The device as claimed in claim 1, in which the wired interconnection block additionally comprises a microcontroller.

3. The device as claimed in claim 1, in which each dialog member comprises two series of electrical contact terminals.

4. The device as claimed in claim 1, in which each dialog member comprises at least one electrical contact.

5. The device as claimed in claim 1, in which each dialog member comprises at least one indicator light.

6. The device as claimed in claim 1, in which each dialog member comprises at least one electrical contact and at least one indicator light.

7. The device as claimed in claim 1, in which functional elements of the dialog members are separated from a connection portion, and each dialog member is physically connected to another dialog member, which is not necessarily adjacent thereto, by a multiconductor cable, the interconnection block being intercalated between two dialog members to which it is also connected by a multiconductor cable.

8. The device as claimed in claim 1, in which at least two adjacent dialog members are joined directly by their respective terminals in order to form a unitary block, the interconnection block being intercalated between two blocks of dialog members to which it is connected either directly by their respective terminals or by a multiconductor cable.

* * * * *